US010571244B2

(12) United States Patent
Vadakke Matham et al.

(10) Patent No.: US 10,571,244 B2
(45) Date of Patent: Feb. 25, 2020

(54) MEASURING SURFACE ROUGHNESS (71) Applicant: ROLLS-ROYCE plc, London (GB)

(72) Inventors: Murukeshan Vadakke Matham, Singapore (SG); Kelvin H K Chan, Singapore (SG); Guru Prasad Arudi Subbarao, Singapore (SG); Prabhathan Patinharekandy, Singapore (SG); Aswin Haridas, Singapore (SG); Pulkit Kapur, Singapore (SG)

(73) Assignee: Rolls-Royce plc (GB)

( * ) Notice: Subject to any disclaimer, the term of this patent is extended or adjusted under 35 U.S.C. 154(b) by 0 days.

(21) Appl. No.: 16/156,030

(22) Filed: Oct. 10, 2018

(65) Prior Publication Data
US 2019/0145755 A1 May 16, 2019

(30) Foreign Application Priority Data

Nov. 13, 2017 (GB) .................................. 1718699.0

(51) Int. Cl.
*G01B 11/30* (2006.01)
*G01B 9/02* (2006.01)

(52) U.S. Cl.
CPC ..... *G01B 9/02096* (2013.01); *G01B 9/02041* (2013.01); *G01B 9/02094* (2013.01); *G01B 11/30* (2013.01); *G01B 11/303* (2013.01)

(58) Field of Classification Search
CPC ............ G01B 9/02041; G01B 9/02049; G01B 9/0205; G01B 9/02094; G01B 11/30; G01B 11/303
See application file for complete search history.

(56) References Cited

U.S. PATENT DOCUMENTS 5,757,496 A 5/1998 Yamazaki
5,831,743 A 11/1998 Ramos et al.
(Continued)

FOREIGN PATENT DOCUMENTS

DE 3412108 10/1984
EP 1586855 A1 10/2005
(Continued)

OTHER PUBLICATIONS

Extended European Search Report, European Patent Application No. 18203672, dated Jan. 16, 2019, 3 pages.
(Continued)

*Primary Examiner* — Jonathan M Hansen
(74) *Attorney, Agent, or Firm* — Barnes & Thornburg LLP (57) ABSTRACT An imaging probe (102) for use in measuring surface roughness by angular speckle correlation is shown. The imaging probe comprises a first illumination fibre (201) to illuminate a sample location (103) on a surface, and having an input end for coupling of coherent light into the fibre, and an output end cleaved at an angle $\theta_1$, a second illumination fibre (202) to illuminate the sample location on the surface, and having an input end for coupling of coherent light into the fibre, and an output end cleaved at an angle $\theta_2$ that is different from $\theta_1$, and an image transmission system (204) for transmission of a speckle pattern caused by illumination of the sample location on the surface by coherent light from either the first illumination fibre or the second illumination fibre.

20 Claims, 6 Drawing Sheets (56) References Cited

U.S. PATENT DOCUMENTS

| | | | | |
|---|---|---|---|---|
| 9,295,391 | B1* | 3/2016 | Tearney | A61B 1/07 |
| 2002/0183601 | A1* | 12/2002 | Tearney | A61B 1/00082 |
| | | | | 600/310 |

FOREIGN PATENT DOCUMENTS

| | | |
|---|---|---|
| JP | S57163851 A | 10/1982 |
| JP | S58158544 A | 9/1983 |
| JP | S6150044 A | 3/1986 |
| WO | 2014176479 | 10/2014 |
| WO | 2017103643 A1 | 6/2017 |

OTHER PUBLICATIONS

"Widefield lensless imaging through a fiber bundle via speckle correlations", Optics Express, Jul. 25, 2016, pp. 16835-16855, vol. 24, Issue No. 15.

Lake, S, "The 'speckleometer': a compact, portable surface roughness measurement unit based on angular speckle correlation", INSIGHT, Sep. 1, 2015, pp. 513-517, vol. 57, Issue No. 9.

Prasad, A S et al., "Fiber Optic Probe for Surface Roughness Measurement of ALM Samples Based on Laser Speckle Intensity", IEEE International Conference on Recent Trends in Electronics Information Communication Technology, pp. 908-912, May 20-21, India.

Dev, et al., "Surface roughness measurement of additive manufactured samples using angular speckle correlation," Fifth International Conference on Optical and Photonics Engineering, SPIE, vol. 10449, 2017.

Great Britain Search Report dated May 14, 2018, issued in GB Patent Application No. 1718699.0.

* cited by examiner

MEASURING SURFACE ROUGHNESS

CROSS-REFERENCE TO RELATED APPLICATIONS

This application is based upon and claims the benefit of priority from British Patent Application No. GB 1718699.0, filed on 13 Nov. 2017, the entire contents of which are incorporated by reference.

BACKGROUND

Technical Field

This disclosure concerns apparatus for use in measuring surface roughness by angular speckle correlation.

Description of the Related Art

Angular speckle correlation is a non-contact measurement technique that allows the roughness of a surface to be evaluated. The technique involves obtaining two speckle patterns by illuminating the same surface with coherent light under two different angles of incidence. The degree of correlation between the speckle patterns, for a fixed difference in angle of incidence, is proportional to the mean roughness $R_a$ and the RMS roughness $R_q$ of the surface.

The technique may be easily validated experimentally by use of standard equipment on an optical bench. However, a demand exists for use of non-contact measurement techniques in, for example, production line and service situations, along with means of measuring surface roughness of components with no line of sight thereto.

SUMMARY

The invention is directed towards apparatus and systems for use in the measurement surface roughness by angular speckle correlation.

In one aspect, an imaging probe is provided. The imaging probe comprises a first illumination fibre to illuminate a sample location on a surface, and having an input end for coupling of coherent light into the fibre, and an output end cleaved at an angle $\theta_1$, and a second illumination fibre to illuminate the sample location on the surface, and having an input end for coupling of coherent light into the fibre, and an output end cleaved at an angle $\theta_2$ that is less than $\theta_1$. The imaging probe also comprises an image transmission system for imaging a speckle pattern caused by illumination of the sample location on the surface by coherent light from either the first illumination fibre or the second illumination fibre.

In another aspect, an imaging system is provided. The system comprises a coherent light source configured to produce coherent light. A first illumination fibre is included to illuminate a sample location on a surface, and having an input end for coupling of the coherent light into the fibre, and an output end cleaved at an angle $\theta_1$. A second illumination fibre is included to illuminate the sample location on the surface, and having an input end for coupling of coherent light into the fibre, and an output end cleaved at an angle $\theta_2$ that is different from $\theta_1$. An image transmission system is included for imaging a speckle pattern caused by illumination of the sample location on the surface by coherent light from the first illumination fibre or the second illumination fibre, along with an imaging device configured to capture an image of light that exits the imaging fibre bundle.

DESCRIPTION OF THE DRAWINGS

Embodiments will now be described by way of example only with reference to the accompanying drawings, which are purely schematic, and not to scale, and in which.

DETAILED DESCRIPTION

Figure 1:
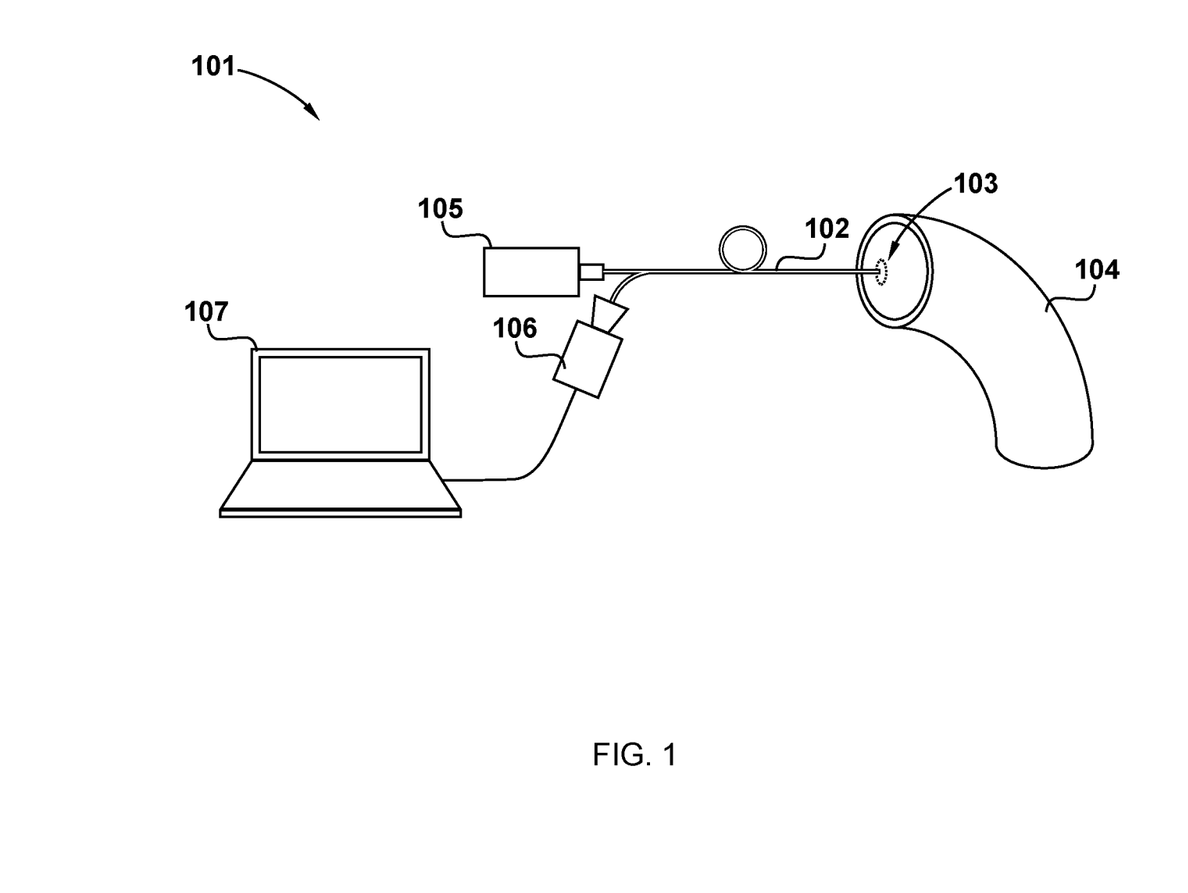
FIG. 1 shows a measurement system for use in measuring surface roughness by angular speckle correlation, which includes an imaging probe.

A measurement system 101 for use in measuring surface roughness by angular speckle correlation is shown in FIG. 1.

The measurement system 101 comprises an imaging probe 102. As will be described further with reference to FIGS. 2 to 5, the imaging probe 102 includes two illumination fibres and an imaging fibre bundle. In the present embodiment, the imaging probe is flexible so as to allow measurement of surface roughness in difficult-to-access areas, such as a sample location 103 on the interior of a component 104. In the present example, the component 104 is a component part of an aircraft engine and has been manufactured from a titanium alloy using an additive layer manufacturing process. It will be appreciated, however, that the imaging probe and the measurement system 101 may be used for measuring surface roughness of other objects.

In order to perform angular speckle correlation, the imaging probe is coupled to a source of coherent light, which in this case is a laser 105, along with an imaging device to capture an image of the light exiting the image transmission system, which in this case is a camera 106.

In the present embodiment, the laser 105 is a helium neon laser having a 632.8 nanometre wavelength and a power of 20 milliwatts. It will be appreciated however that other laser specifications and types may be employed, as angular speckle correlation has been shown to work with a large range of laser sources.

In the present embodiment, the coherent light from the laser 105 forms a speckle pattern due to its interaction with surface geometry at the sample location. The speckle pattern is imaged by the imaging fibre bundle which conveys it to the camera 106.

The camera 106 in the present embodiment comprises a monochrome CCD imaging sensor having a 1.3 megapixel resolution. The camera 105 may alternatively comprise a different imaging sensor type, such as a colour sensor, a CMOS sensor, and/or a higher or lower resolution. The camera further comprises in this example a lens for focussing the speckle pattern conveyed by the imaging fibre bundle onto the imaging sensor.

Image processing is performed by a personal computer 107 connected to the camera 106. The overall process of determining the roughness of the sample location 103 will be described with reference to FIG. 5.

Figure 2:
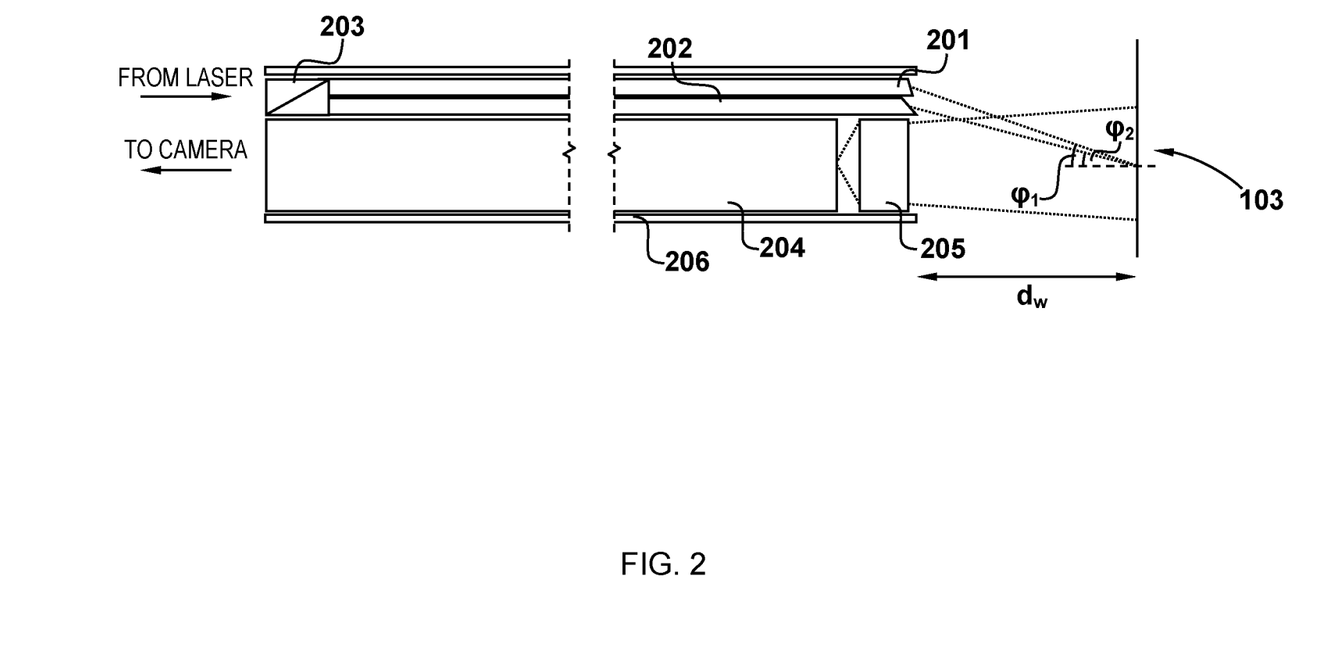
FIG. 2 shows the imaging probe of FIG. 1 in more detail, including first and second illumination fibres.

A cutaway view of the imaging probe 102 is shown in FIG. 2.

The imaging probe 102 includes a first illumination fibre 201 and a second illumination fibre 202. In an embodiment, the first illumination fibre 201 and the second illumination fibre 202 are single mode fibres. This may aid in reducing transmission loss, and may allow the probe to have a smaller overall diameter. Multi-mode fibres may still be used, however, depending upon the requirements of the measurement system 101.

In a specific embodiment, the first illumination fibre 201 and the second illumination fibre 202 each have 125 micrometre diameter cores.

As described previously, coherent light from the laser 105 is in use coupled into one of the fibres. In the present embodiment, this is achieved by use of an optical switching device, which in this case is a moveable mirror 203 configured to couple coherent light from the laser 105 into the input end of either the first illumination fibre 201, or the input end of either the second illumination fibre 202. This allows the sample location 103 to either be illuminated by the coherent light from laser 105 via the first illumination fibre 201 or the second illumination fibre 202.

Figure 3:
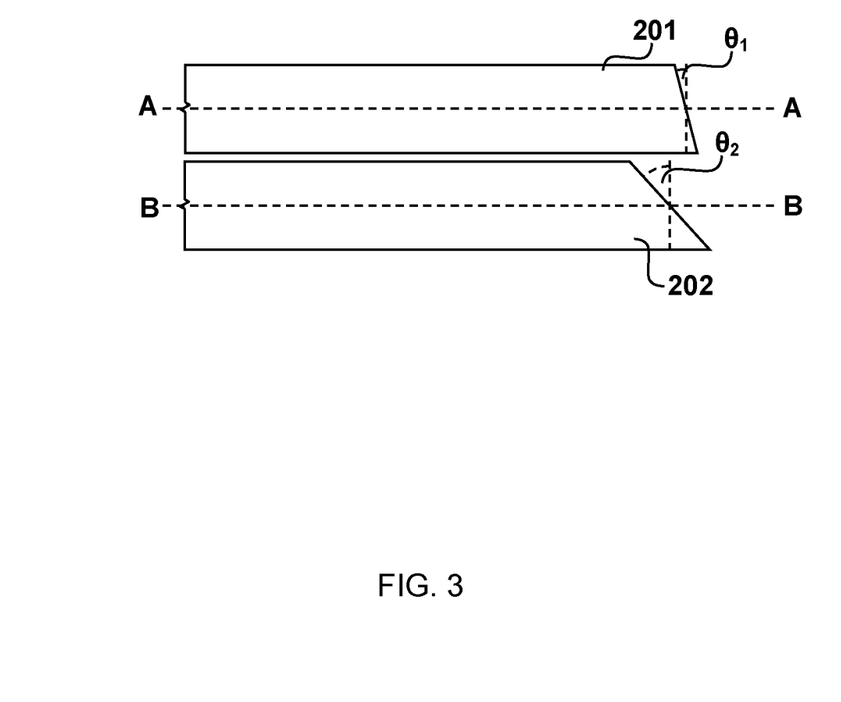
FIG. 3 shows the first and second illumination fibres of FIG. 2 in more detail.

As described previously, angular speckle correlation involves illuminating from two different angles of incidence. Referring to FIG. 3, the first illumination fibre 201 thus has an output end which is cleaved at an angle $\theta_1$ with respect to the perpendicular of the axis A-A of the fibre. The second illumination fibre 201 has an output end which is cleaved at an angle $\theta_2$ with respect to the perpendicular of the axis B-B of the second illumination fibre 201. Angle $\theta_1$ is different from angle $\theta_2$ by an amount $\delta\theta$. Cleaving of the fibres 201 and 202 by angles that differ by $\delta\theta$ results in coherent light exiting the fibres at different angles. In use, therefore, the sample location 103 is illuminated by coherent light at two different angles of incidence $\varphi_1$ and $\varphi_2$ that differ by an amount $\delta\varphi$.

Figure 4:
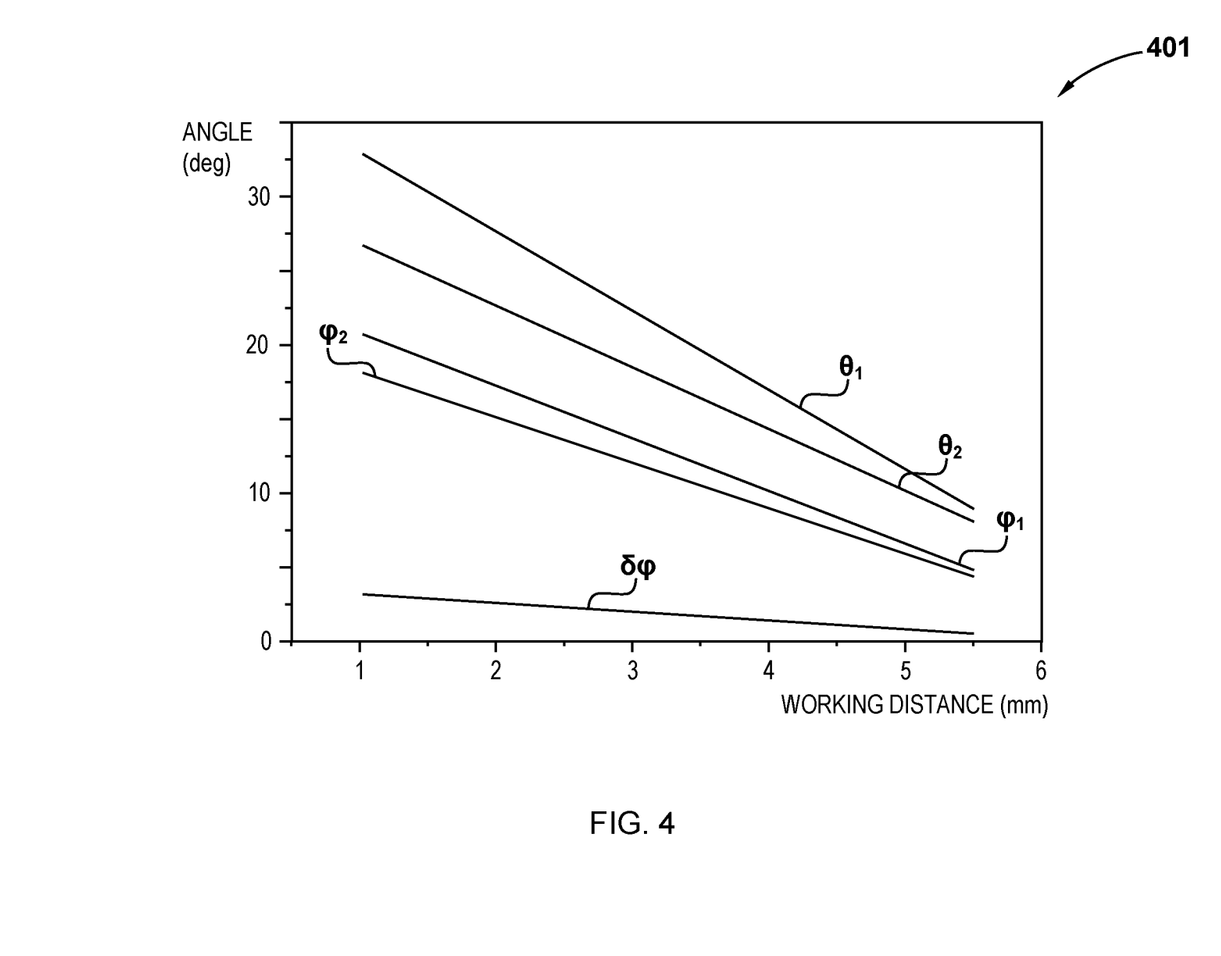
FIG. 4 is a plot showing the relationship between working distance of the probe; cleave angles and angles of incidence.

The fibre cleaving angles $\theta_1$ and $\theta_2$ are selected based the desired angle of incidence $\varphi_1$, $\varphi_2$ and probe working distance $d_w$. FIG. 4 is a plot which shows the relationship between fibre cleaving angles $\theta_1$ and $\theta_2$, angle of incidence $\varphi_1$, $\varphi_2$, $\delta\varphi$, and probe working distance $d_w$.

In an embodiment, angle $\varphi_1$ is 10 degrees. In an embodiment, the difference $\delta\varphi$ is from 1 to 2 degrees. In the present embodiment, this therefore means that angle $\varphi_2$ is from 11 to 12 degrees.

Other angles may be selected depending upon the target application of the probe.

Referring again to FIG. 2, the difference be is such that the coherent light emerging from the output ends of each fibre 201 and 202 converges at a working distance $d_w$ from the end of the imaging probe 102, such that the same sample location 103 is illuminated irrespective of which fibre the coherent light is coupled into. This permits the production of speckle patterns from two angles of incidence from the same sample area.

The speckle patterns produced due to the illumination of sample location 103 are in the form of light reflected from the sample location 103. This light is transmitted back to camera 106 by an image transmission system, which in this embodiment comprises an imaging fibre bundle 204. In the present embodiment, the imaging fibre bundle 204 comprises a plurality of fibre cores arranged coherently so as to ensure image integrity. In the present embodiment, the bundle contains 10000 cores, although it will be appreciated that a smaller or greater number could be used depending upon the required resolution.

In the present example, the light is coupled into the imaging fibre bundle 204 by a lens system 205. In the present example, the lens system has a focal length f that provides field of view sufficient to image the totality of the speckle patterns. In a specific embodiment, the lens system 205 comprises a single objective lens. Alternatively, the lens system 205 may comprise a plurality of lenses. In an alternative embodiment, the lens system 205 may be a microlens array.

In this embodiment, the imaging probe 102 further comprises a sheath 206 for containing and protecting the fibres. The sheath may be made from stainless steel. The sheath may be made from rubber. Alternatively, any suitable protective material may be used to form the sheath.

Figure 5:
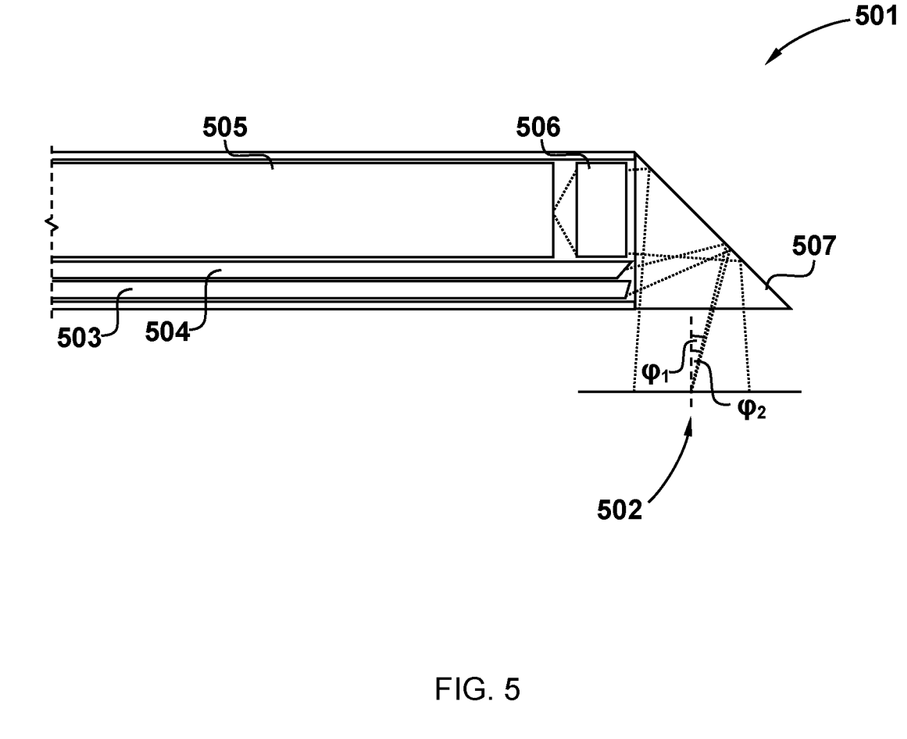
FIG. 5 shows an alternative imaging probe.

An alternative imaging probe 501 is shown in FIG. 5. The imaging probe 501 may be used in place of imaging probe 102 in cases where the sample location 502 to be evaluated is substantially parallel to the axis of the probe.

In order to achieve this functionality, the imaging probe 501 comprises—in addition to a first illumination fibre 503, a second illumination fibre 504, an imaging fibre bundle 505, and a lens system 506—an optical prism 507. The optical prism 507 is configured to redirect light exiting the first illumination fibre 502 and the second illumination fibre 503. In the present embodiment, the optical prism 507 is a right-angled prism and so coherent light from the illumination fibres is deflected through 90 degrees by total internal reflection. Other prism configurations and thus angles may be used depending upon the requirements of the probe. It is therefore also configured to direct light entering it from the sample location 502 such that it is coupled into the imaging fibre bundle 505 by the lens system 506.

It is envisaged that the functionality of optical prism 507 may alternatively be provided by a mirror system, for example.

Figure 6:
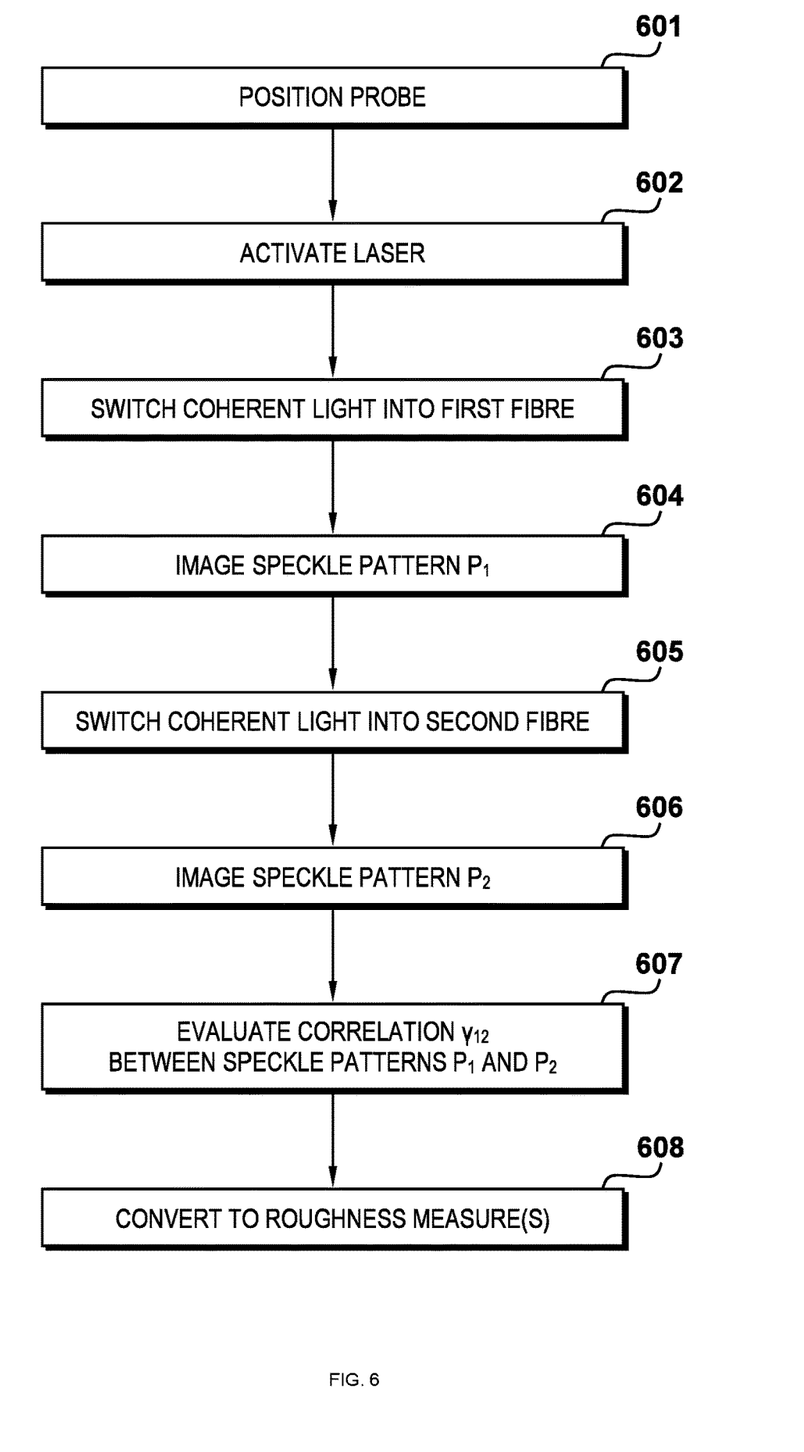
FIG. 6 shows a method of measuring surface roughness by angular speckle correlation using the measurement system of FIG. 1.

A flow diagram illustrating a method of measuring surface roughness using the measurement system 101 is shown in FIG. 6.

At step 601, the imaging probe 102 (or 501) is positioned in the appropriate place. In the present example, this involves, with imaging probe 102, positioning it such that the tip of the probe 102 is perpendicular to the sample location 103 and at working distance $d_w$ therefrom. The laser 105 is then activated at step 602.

At step 603, the optical switching device is switched to the first illumination fibre. In the present example, therefore, the moveable mirror 203 is moved such that coherent light from the laser 105 is coupled into the first illumination fibre 201.

At step 604, the speckle pattern $P_1$ caused by illumination of the sample location 103 by coherent light from the first illumination fibre 201 is imaged by the camera 106. The speckle pattern $P_1$ may then be transferred to storage in personal computer 107.

At step 605, the optical switching device is switched to the second illumination fibre. In the present example, therefore, the moveable mirror 203 is moved such that coherent light from the laser 105 is coupled into the second illumination fibre 202.

At step 606, the speckle pattern $P_2$ caused by illumination of the sample location 103 by coherent light from the second illumination fibre 202 is imaged by the camera 106. The speckle pattern $P_2$ may then be transferred to storage in personal computer 107.

The correlation between $P_1$ and $P_2$ is then evaluated at step 607. In the present example, this evaluation is performed by personal computer 107.

The angular speckle correlation $\gamma_{12}$ between the two speckle patterns $P_1$ and $P_2$ imaged at a location $(\xi,\eta)$ in the Fourier plane is evaluated using the relation:

$$\gamma_{12} = \frac{\sum_\xi \sum_\eta P_1 P_2}{\sqrt{\sum_\xi \sum_\eta P_1^2 \sum_\xi \sum_\eta P_2^2}} \quad \text{[Equation 1]}$$

At step 608, this value is converted into roughness measures. The angular speckle correlation $\gamma_{12}$ is related to the RMS roughness of a surface $R_q$ as follows:

$$\gamma_{12} = \exp(-R_q^2 k^2 \delta\varphi^2 \sin^2 \varphi_1) \quad \text{[Equation 2]}$$

in which $\varphi_1$ is the angle of incidence of light from the first illumination fibre 201, $\delta\varphi$ is the change of angle of incidence between the first and second illumination fibres 201 and 202, $k=2\pi/\lambda$ is the propagation constant of the coherent light having wavelength $\lambda$.

The mean roughness of the surface $R_a$ may additionally be evaluated by using the relation:

$$R_a = \sqrt{\frac{2}{\pi}} R_q \quad \text{[Equation 3]}$$

As the wavelength $\lambda$ of laser 105 remains fixed, as do the angle of incidence $\varphi$ and difference in angle of incidence $\delta\varphi$, it is possible to efficiently derive values for the mean roughness of the surface $R_a$ the RMS roughness of a surface $R_q$ at sample location 103.

The invention claimed is:

1. An imaging probe for use in measuring surface roughness by angular speckle correlation, the imaging probe comprising:
   a first illumination fibre to illuminate a sample location on a surface, and having an input end for coupling of coherent light into the fibre, and an output end cleaved at an angle $\theta_1$;
   a second illumination fibre to illuminate the sample location on the surface, and having an input end for coupling of coherent light into the fibre, and an output end cleaved at an angle $\theta_2$ that is different from $\theta_1$; and
   an image transmission system for transmission of a speckle pattern caused by illumination of the sample location on the surface by coherent light from either the first illumination fibre or the second illumination fibre.

2. The imaging probe of claim 1, in which the image transmission system comprises an imaging fibre bundle.

3. The imaging probe of claim 2, further comprising a lens system to focus light reflected from the surface onto an input end of the imaging fibre bundle.

4. The imaging probe of claim 2, in which the lens system comprises a microlens array.

5. The imaging probe of claim 1, in which the first illumination fibre, the second illumination fibre and the image transmission system are flexible.

6. The imaging probe of claim 1, in which the first illumination fibre and the second illumination fibre are single-mode fibres.

7. The imaging probe of claim 1, in which the first illumination fibre and the second illumination fibre each have 125 micrometre diameter cores.

8. The imaging probe of claim 1, further comprising an optical prism configured to direct light exiting the first illumination fibre and the second illumination fibre to illuminate sample location on surfaces that are not normal to the fibre bundles.

9. The imaging probe of claim 8, in which the optical prism is a right-angled prism.

10. A measurement system for use in measuring surface roughness by angular speckle correlation, the system comprising:
    a coherent light source configured to produce coherent light;
    a first illumination fibre to illuminate a sample location on a surface, and having an input end for coupling of the coherent light into the fibre, and an output end cleaved at an angle $\theta_1$;
    a second illumination fibre to illuminate the sample location on the surface, and having an input end for coupling of coherent light into the fibre, and an output end cleaved at an angle $\theta_2$ that is different from $\theta_1$;
    an image transmission system for transmission of a speckle pattern caused by illumination of the sample location on the surface by coherent light from the first illumination fibre or the second illumination fibre; and
    an imaging device configured to capture an image of light that exits the imaging fibre bundle.

11. The measurement system of claim 10, in which the image transmission system comprises an imaging fibre bundle.

12. The measurement system of claim 11, further comprising a lens system to focus light reflected from the surface onto the input end of the imaging fibre bundle.

13. The measurement system of claim 10, further comprising an optical switching device to selectively couple coherent light into the input end of one of the first illumination fibre and the second illumination fibre.

14. The measurement system of claim 10, further comprising an image processor configured to evaluate the angular speckle correlation factor between a first image obtained when the sample location on the surface is illuminated with coherent light from the first illumination fibre, and a second image obtained when the sample location on the surface is illuminated with coherent light from the second illumination fibre.

15. The measurement system of claim 12, in which the lens system comprises a microlens array.

16. The measurement system of claim 10, in which the first illumination fibre, the second illumination fibre and the image transmission system are flexible.

17. The measurement system of claim 10, in which the first illumination fibre and the second illumination fibre are single-mode fibres.

18. The measurement system of claim 10, in which the first illumination fibre and the second illumination fibre each have 125 micrometre diameter cores.

19. The measurement system of claim 10, further comprising an optical prism configured to direct light exiting the first illumination fibre and the second illumination fibre to illuminate sample location on surfaces that are not normal to the fibre bundles.

20. The measurement system of claim 19, in which the optical prism is a right-angled prism.

* * * * *